(12) United States Patent
Han et al.

(10) Patent No.: US 9,120,371 B2
(45) Date of Patent: Sep. 1, 2015

(54) MOUNTING STRUCTURE FOR IN-VEHICLE POWER BATTERY AND VEHICLE COMPRISING THE SAME

(75) Inventors: Fei Han, Shenzhen (CN); Bengang Yi, Shenzhen (CN); Hengshan Zhang, Shenzhen (CN)

(73) Assignees: SHENZHEN BYD AUTO R&D COMPANY LIMITED, Shenzhen (CN); BYD COMPANY LIMITED, Shenzhen (CN)

( * ) Notice: Subject to any disclaimer, the term of this patent is extended or adjusted under 35 U.S.C. 154(b) by 0 days.

(21) Appl. No.: 14/234,581

(22) PCT Filed: Jul. 27, 2012

(86) PCT No.: PCT/CN2012/079302
§ 371 (c)(1),
(2), (4) Date: Jan. 23, 2014

(87) PCT Pub. No.: WO2013/017051
PCT Pub. Date: Feb. 7, 2013

(65) Prior Publication Data
US 2014/0158444 A1    Jun. 12, 2014

(30) Foreign Application Priority Data

Jul. 29, 2011   (CN) .......................... 2011 2 0271301

(51) Int. Cl.
*B60K 1/04*   (2006.01)

(52) U.S. Cl.
CPC ........... *B60K 1/04* (2013.01); *B60K 2001/0438* (2013.01); *B60K 2001/0472* (2013.01)

(58) Field of Classification Search
CPC ....................................................... B60K 1/04
USPC ............................... 180/68.5, 65.1, 311, 312
See application file for complete search history.

(56) References Cited

U.S. PATENT DOCUMENTS

| 5,392,873 | A  | * | 2/1995  | Masuyama et al. .......... 180/68.5 |
| 6,176,338 | B1 |   | 1/2001  | Nakagawa |
| 7,581,913 | B2 | * | 9/2009  | Ordonio et al. ............... 411/542 |
| 2010/0307848 | A1 | * | 12/2010 | Hashimoto et al. .......... 180/68.5 |

FOREIGN PATENT DOCUMENTS

| CN | 201329795 Y | 10/2009 |
| CN | 201769670 U | 3/2011 |
| CN | 202174925 U | 3/2012 |

OTHER PUBLICATIONS

Shenzhen BYD Auto R&D Company Limited, International Search Report, PCT/CN2012/079303, Oct. 4, 2012, 3 pgs.
Shenzhen BYD Auto R&D Company Limited, International Search Report, PCT/CN2012/079302, Oct. 25, 2012, 3 pgs.

* cited by examiner

*Primary Examiner* — J. Allen Shriver, II
*Assistant Examiner* — Bryan Evans
(74) *Attorney, Agent, or Firm* — Morgan, Lewis & Bockius LLP

(57) ABSTRACT

A mounting structure for an in-vehicle power battery may be provided. The mounting structure may comprise an upper cover (3), a suspension tray (1) and a bracket (2) for supporting at least a peripheral bottom portion of the suspension tray (1). The suspension tray (1) may be hermetically connected with the upper cover, forming a sealed space for receiving the power battery. The bracket (2) may be detachably fixed to a bottom surface of a body floor in a vehicle. Further, a vehicle (100) comprising the mounting structure described above is also provided.

10 Claims, 3 Drawing Sheets

MOUNTING STRUCTURE FOR IN-VEHICLE POWER BATTERY AND VEHICLE COMPRISING THE SAME

CROSS-REFERENCE TO RELATED APPLICATIONS

This application is a United States National Stage Application filed under 35 U.S.C. §371 of PCT Patent Application Serial No. PCT/CN2012/079302 filed on Jul. 27, 2012, which claims priority to and benefits of Chinese Patent Application Serial No. 201120271301.X, filed on Jul. 29, 2011, the entire contents of which are incorporated herein by reference.

This application is related to United States Utility Patent Application, "Mounting Structure for In-Vehicle Power Battery and Vehicle Comprising the Same," filed on Jan. 23, 2014, the contents of which is incorporated by reference herein in its entirety.

FIELD

The present disclosure relates to the field of vehicle, more particularly to a mounting structure for an in-vehicle power battery and a vehicle comprising the same.

BACKGROUND

The statements in this section merely provide background information related to the present disclosure and may not constitute prior art.

Commonly, power batteries in an electric vehicle or a hybrid powered vehicle are normally accommodated in a suspension tray which is provided under a body floor of a vehicle. And normally the peripheral edge of the suspension tray is connected to the body floor, thus the power battery may be mounted under the body floor. However, because the body floor is not sealed, liquid such as water etc. may flow from the body floor to the power battery to bring damage to the power battery accordingly.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In viewing thereof, the present disclosure is directed to solve at least one of the problems existing in the prior art. Accordingly, a mounting structure for an in-vehicle power battery may need to be provided, which may protect the power battery from being damaged by, intentional or unintentional, water leakage or seepage etc. In addition, a vehicle comprising the same may need to be provided.

According to an aspect of the present disclosure, a mounting structure for an in-vehicle power battery may be provided. The mounting structure may comprise an upper cover, a suspension tray and a bracket for supporting at least a peripheral bottom portion of the suspension tray. The suspension tray may be hermetically connected with the upper cover, forming a sealed space for receiving the power battery. The bracket is detachably fixed to a bottom surface of a body floor in a vehicle.

Thus, due to the sealing performance of the hermetically connected upper cover and the suspension tray, liquid such as water etc. may not flow into the sealed space, thus ameliorating the negative damage caused by liquid seepage etc.

In one embodiment, a vehicle comprising the above mounting structure is provided.

Other advantages and features of the disclosure are described below.

BRIEF DESCRIPTION OF THE DRAWINGS

These and other aspects and advantages of the disclosure will become apparent and more readily appreciated from the following descriptions taken in conjunction with the drawings in which.

DETAILED DESCRIPTION

Figure 1:
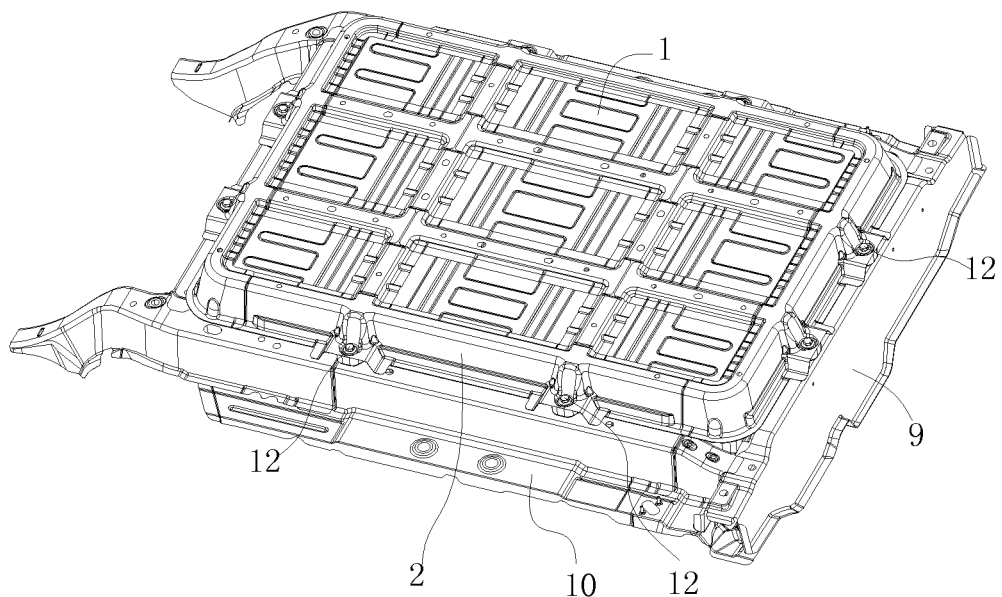
FIG. 1 is a schematic bottom perspective view of a mounting structure for an in-vehicle power battery according to an embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. It is to be understood that, the embodiments described herein are merely used to generally understand the present disclosure, but shall not be construed to limit the present disclosure.

In the following, detailed description of a mounting structure for an in-vehicle power battery will be described, in which like numerals refer to like elements through the accompanying figures.

Figure 4:
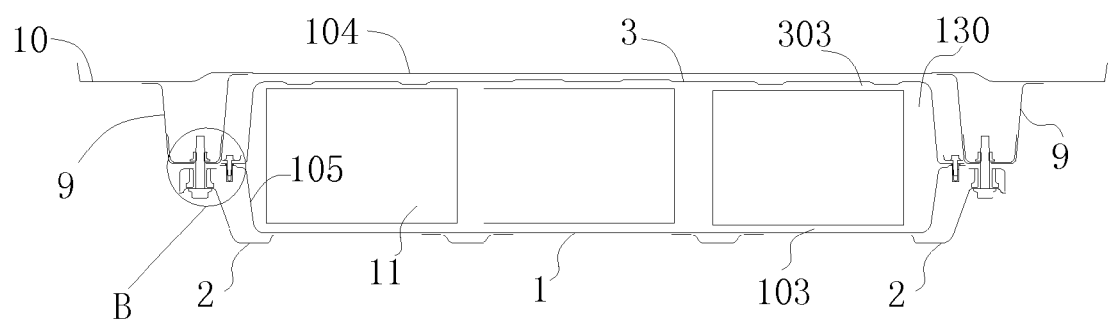
FIG. 4 is a schematic cross sectional view along line A-A shown in FIG. 3.

As shown in FIG. 1 to FIG. 5, in one embodiment, the mounting structure for an in-vehicle power battery may comprise a body floor 10, an upper cover 3, a suspension tray 1 and a bracket 2 for supporting at least a peripheral bottom portion of the suspension tray 1. The suspension tray 1 may be hermetically connected with the upper cover 3, forming a sealed space 130 for receiving the power battery 11, as shown in FIG. 4. The bracket 2 may be detachably fixed to a bottom surface of the body floor 10 in a vehicle. It should be noted that the body floor is described here in a general meaning, and it may be the body floor of a motorized vehicle, bus, heavy transportation truck etc. that may be powered by a power battery.

In one embodiment, as shown in FIG. 1, the mounting structure may further comprise a supporting beam 9 formed on the bottom surface 104 of the body floor 10 surrounding the upper cover 3 and the suspension tray 1. As shown in FIG. 4, the supporting beam 9, the upper cover 3, the suspension tray 1 and the bracket 2 are provided under the body floor 10, the bracket 2 is detachably and fixedly connected to the supporting beam 9 and the supporting beam 9 is fixed to the body floor 10.

In one embodiment, the supporting beam 9 may be configured to be square, rectangular or other annular shaped form, only if it may surround the suspension tray 1.

In one embodiment, the suspension tray 1 is formed with a first joint portion 101 at a peripheral edge thereof; and the upper cover 3 is formed with a second joint portion 301 at a peripheral edge thereof which is configured to be hermetically and detachably fixed with the first joint portion 101, with a peripheral sealing member 4 being interposed therebetween. During assembly, the peripheral sealing member 4 is tightly compressed between the first joint portion 101 and the second joint portion 301 for sealing purpose. By using the peripheral sealing member 4, such as an annular one, the sealing performance between the upper cover 3 and the suspension tray 1 may be accomplished.

In one embodiment, the first joint portion 101 is formed with a stepped portion 102 at a transition portion where the first joint portion 101 is joined with an inner wall 105 of the suspension tray 1. And the stepped portion 102 is filled with sealant 5 which is bonded with the second joint portion 301. By using the sealant 5, the sealing performance between the upper cover 3 and the suspension tray 1 may be further strengthened.

Figure 2:
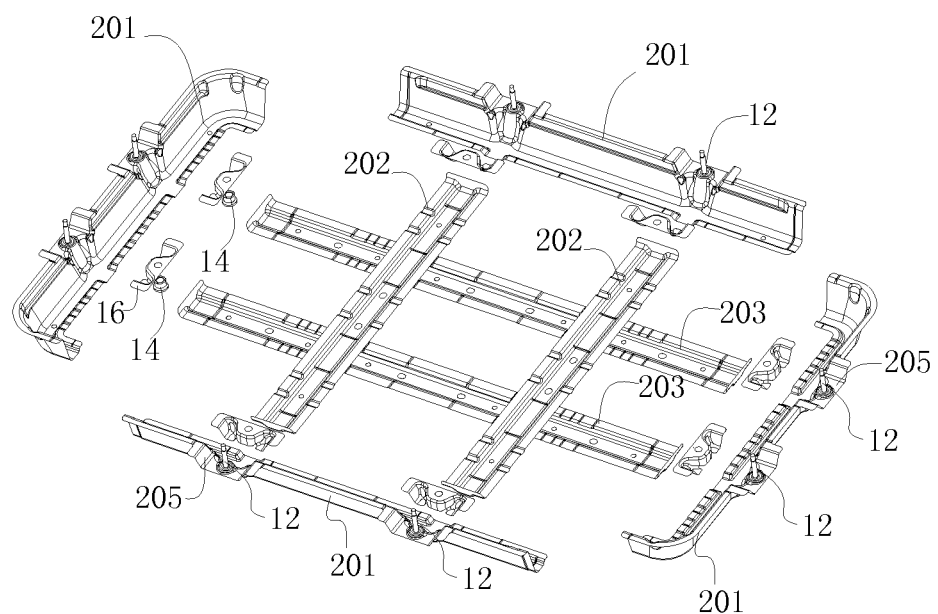
FIG. 2 is an exploded top perspective view of a suspension tray according to an embodiment of the present disclosure.
Figure 3:
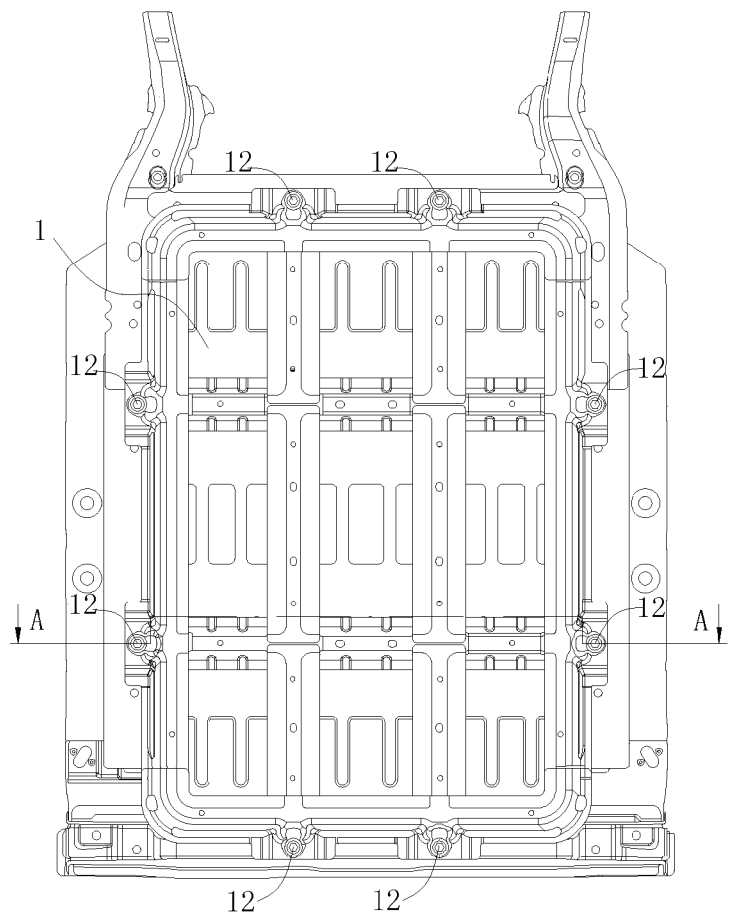
FIG. 3 is a bottom plan view of a mounting structure for an in-vehicle power battery according to another embodiment of the present disclosure.

In one embodiment, the mounting structure may further comprise a plurality of water proof nuts 6 and a plurality of corresponding first bolts 7. The water proof nuts 6 may be fixed with the first joint portion 101. And as shown in FIG. 2, the water proof nuts 6 may be distributed on the first joint portion 101 peripherally in regular intervals or evenly, with an end thereof being protruded downwardly. And the first bolts 7 are correspondingly connected with the water proof nuts 6 for detachably connecting the first joint portion 101 with the second joint portion 301.

Figure 5:
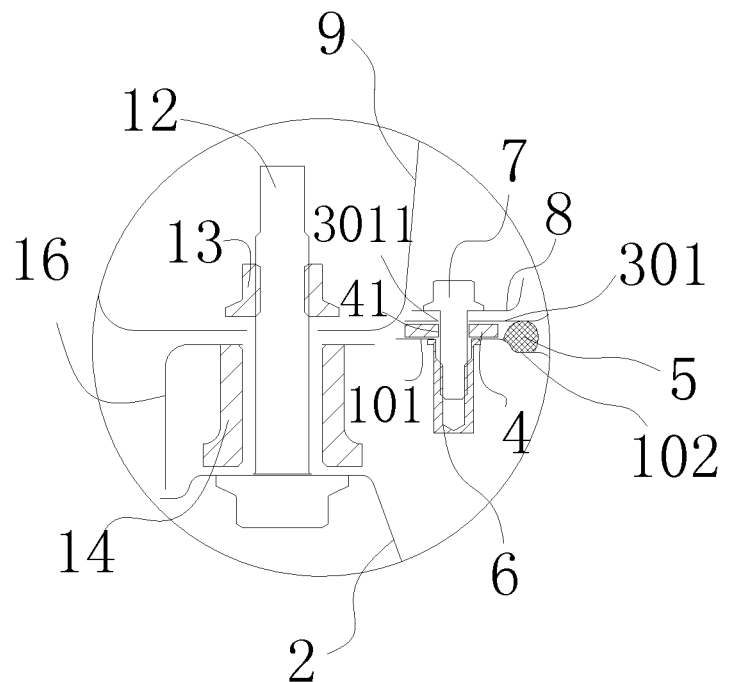
FIG. 5 is an enlarged schematic view of the part B indicated in FIG. 4.

To be specific, the second joint portion 301 may be formed with a plurality of corresponding first via holes 3011. The peripheral sealing member 4 may be formed with corresponding second via holes 41. In one embodiment, the water-proof nuts 6 may be riveted with the first joint portion 101. As shown in FIG. 5, the screw hole in the water-proof nut 6 may be a blind one. Thus, even liquid like water may seep into the first via holes 3011, it can still not be further seeped inside the sealed space 130 to damage the power battery accordingly. In one embodiment, there are 8 water-proof nuts 6 along the first joint portion 101, with each side having two water-proof nuts 6 as shown in FIG. 2.

In one embodiment, the mounting structure further comprises a peripheral pressure plate 8. The peripheral pressure plate 8 is configured to be provided on an upper surface of the second joint portion 301 and fixed therewith via coupling of the first bolts 7 and the water proof nuts 6. The peripheral pressure plate 8 may ensure enhanced uniform contact among the first joint portion 101, the peripheral sealing member 4 and the second joint portion 301.

In one embodiment, the suspension tray 1 may be formed with a stepped portion 102 at a transition portion where the first joint portion 101 may be joined with an inner wall 105 of the suspension tray 1. The stepped portion 102 may be filled with sealant 5 which is bonded with the second joint portion 301.

As shown in FIG. 4, the suspension tray 1 may be formed with a first concaved chamber 103. The first joint portion 101 surrounds the first concaved chamber 103; the upper cover 3 is formed with a second concaved chamber 303. The second joint portion 301 surrounds the second concaved chamber 303, and the first concaved chamber 103 and the second concaved chamber 303 together form the sealed space 130.

In one embodiment, the bracket 2 may comprise four side frames 201 that are connected in series which are fixedly connected with the bottom portion of the suspension tray 1. In addition, the side frames 201 may be detachably connected with the supporting beam 9. The suspension tray 1 and the upper cover 3 are provided inside an area enclosed by the four side frames 201. The side frames 201, the supporting beam 9 and the vehicle floor 10 may form a protective structure to enhance the impact strength of the power battery received in the mounting structure in addition to improved sealing performance. Further, the mounting structure is compact compared with conventional art.

In one embodiment, the bracket 2 may further comprise at least a first reinforced beam 202 and at least a second reinforced beam 203. The first reinforced beam 202 is connected between the front and back side frames 201, and the second reinforced beam 203 is connected between the left and right side frames 201 respectively, as shown in FIG. 2. In one embodiment, the first reinforced beam 202 is perpendicular to the second reinforced beam 203. The first reinforced beam 202 and the second reinforced beam 203 may be fixedly connected to the bottom surface of the suspension tray 1 for further strengthening the support thereof accordingly. As shown in FIG. 2, there are two first reinforced beams 202 and two second reinforced beam 203. In one embodiment, the first reinforced beam 202 and the second reinforced beam 203 may be fixed with each other.

In one embodiment, each of the side frames 201 may be formed with at least a concaved portion 205 formed on a side of the side frame 201 where the side frame 201 is fixed to the supporting beam 9 via a second bolt 12 screwed with a corresponding nut 13. As shown in FIGS. 1 and 2, there are a plurality of the second bolts 12 and the corresponding nuts 13. In one embodiment, the mounting structure may further comprise a sealing cover 16 received in the concaved portion 205 which may be fitted over the second bolt 12 for shielding the concaved portion 205, so that liquid like water may not easily erode the second bolts 12. A supporting sleeve 14 is fitted over the second bolt 12 and interposed between the sealing cover 16 and the first joint portion 101 to adjust the interval therebetween. As shown in FIG. 2, there are eight second bolts 12 and eight corresponding nuts 13 to be mated therewith which are distributed circumferentially.

Figure 6:
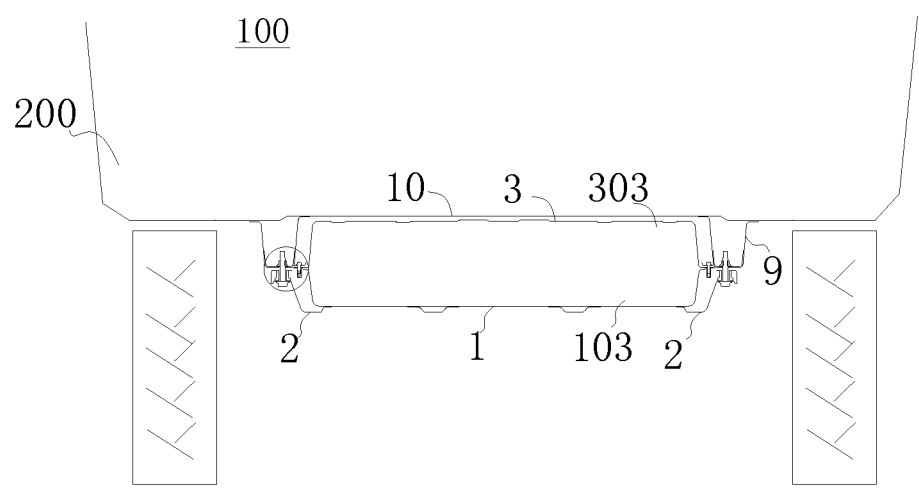
FIG. 6 is a schematic view of a vehicle according to another embodiment of the present disclosure.

In the following a vehicle comprising the above mounting structure will be described in detail. As shown in FIG. 6, the vehicle 100 may comprise a vehicle body 200. And the mounting structure according to an embodiment of the present disclosure may be provided under the body floor 10. Due to the sealing performance of the hermetically connected upper cover 3 and the suspension tray 1, liquid such as water etc. may not flow into the sealed space 130, thus ameliorating the negative damage caused by liquid seepage etc.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A mounting structure for an in-vehicle power battery, comprising:
   an upper cover;
   a support tray hermetically connected to the upper cover, the support tray forming a sealed cavity with the upper cover for receiving the power battery;

a bracket for supporting at least a peripheral bottom portion of the support tray, wherein the bracket is detachably fixed to a bottom surface of a body floor in a vehicle; and a supporting beam formed on the bottom surface of the body floor surrounding the upper cover and the support tray, wherein the bracket is detachably connected to the supporting beam;

wherein the bracket comprises four side frames connected in series which are fixedly connected to the bottom portion of the support tray, and the side frames are detachably connected to the supporting beam and each of the side frames is formed with at least a concaved portion where the side frame is fixed to the supporting beam via a second bolt coupled with a corresponding nut.

2. The mounting structure of claim 1, wherein the support tray is formed with a first joint portion at a peripheral edge thereof; and the upper cover is formed with a second joint portion at a peripheral edge thereof which is configured to be hermetically and detachably fixed with the first joint portion with a peripheral sealing member being interposed therebetween.

3. The mounting structure of claim 2, wherein the support tray is formed with a stepped portion at a transition portion where the first joint portion is joined with an inner wall of the support tray; and the stepped portion is filled with sealant which is bonded with the second joint portion.

4. The mounting structure of claim 3, further comprising:

a plurality of water proof nuts fixed with the first joint portion which are distributed on the first joint portion peripherally; and a plurality of first bolts, each first bolt being connected to corresponding water-proof nut for detachably connecting the first joint portion with the second joint portion.

5. The mounting structure of claim 4, further comprising a peripheral pressure plate configured to be located on a top surface of the second joint portion and fixed therewith via coupling of the first bolts and the water proof nuts.

6. The mounting structure of claim 1, wherein the bracket further comprises:

at least a first reinforcing beam connected between the side frames facing with each other; and at least a second reinforcing beam connected between the remaining side frames facing with each other.

7. The mounting structure of claim 6, wherein the first reinforcing beam is perpendicular to the second reinforcing beam, and the first and second beam are connected to the support tray for supporting thereof.

8. The mounting structure of claim 1, further comprising:

a sealing cover received in the concaved portion which is fitted over the second bolt for sealing the concaved portion, wherein a supporting sleeve is fitted over the second bolt and interposed between the sealing cover and the first joint portion.

9. A mounting structure for an in-vehicle power battery, comprising:

an upper cover;

a support tray hermetically connected to the upper cover, the support tray forming a sealed cavity with the upper cover for receiving the power battery;

a bracket for supporting at least a peripheral bottom portion of the support tray, wherein the bracket is detachably fixed to a bottom surface of a body floor in a vehicle; and a supporting beam formed on the bottom surface of the body floor surrounding the upper cover and the support tray, wherein the bracket is detachably connected to the supporting beam;

wherein the bracket comprises four side frames connected in series which are fixedly connected to the bottom portion of the support tray, and the side frames are detachably connected to the supporting beam and each of the side frames is formed with at least a concaved portion where the side frame is fixed to the supporting beam via a second bolt coupled with a corresponding nut;

wherein the support tray is formed with a first joint portion at a peripheral edge thereof; and the upper cover is formed with a second joint portion at a peripheral edge thereof which is configured to be hermetically and detachably fixed with the first joint portion with a peripheral sealing member being interposed therebetween; and wherein the support tray is formed with a stepped portion at a transition portion where the first joint portion is joined with an inner wall of the support tray; and the stepped portion is filled with sealant which is bonded with the second joint portion.

10. A vehicle comprising a mounting structure according to claim 1.

* * * * *